Dec. 21, 1937.    H. D. VAN LEUNEN    2,102,928
ILLUMINATING DEVICE
Filed Aug. 15, 1935
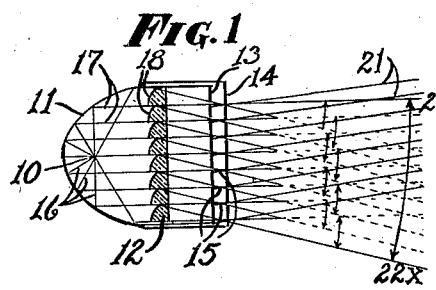
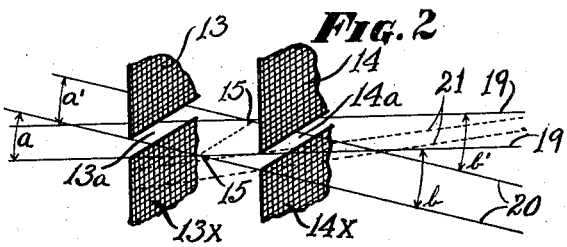
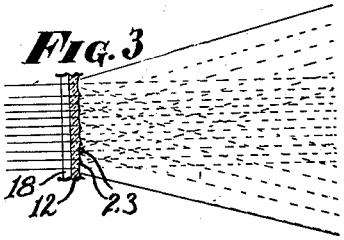
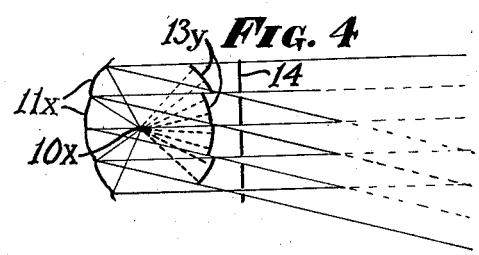
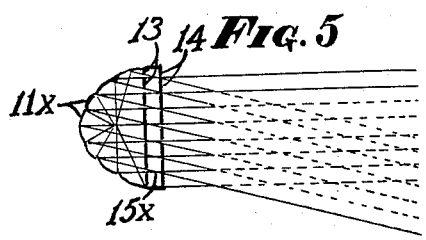
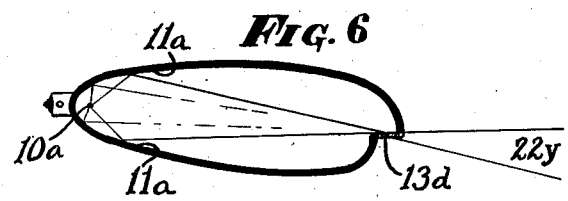
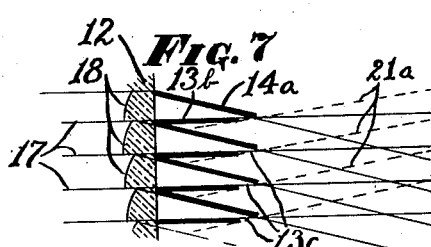
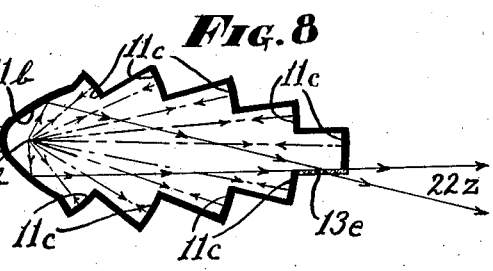
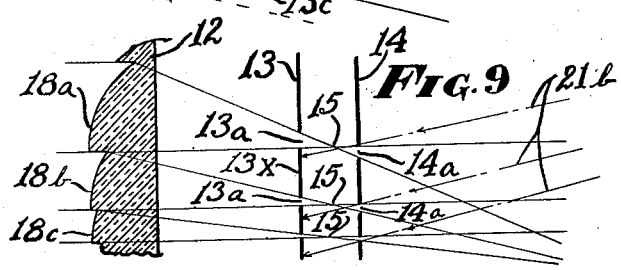
INVENTOR.
Harry D. Van Leunen Patented Dec. 21, 1937

2,102,928

UNITED STATES PATENT OFFICE 2,102,928

ILLUMINATING DEVICE

Harry D. Van Leunen, Wichita, Kans.

Application August 15, 1935, Serial No. 36,434

3 Claims. (Cl. 240—41.3)

My invention relates to an improvement in lighting equipment and refers more particularly to lighting equipment such as used for headlights on power driven vehicles.

Heretofore, headlights have been composed chiefly of a light source and a reflector for directing and focusing the rays of light originating at the light source and the focusing of the rays of light have been supplemented by prisms of varying shapes and sizes which have been set at various positions, all of which have been dependent upon the peculiarities of the lighting device in question. However in all of these devices the light has been projected forward and the range of spread of light has been such that the light is projected directly into the eyes of a person who may be facing or approaching the light, and due to this fact, the person becomes blinded from the light and becomes unable to retain his bearings or line of travel to an extent where he is confident or where he can depend with certainty on his exact line of travel, and as a result of this, many accidents occur. Therefore it is obvious that if a lighting equipment could be produced that would amply light ahead, and devoid of the glaring effect above described, the device would be both valuable and useful.

In view of the foregoing explanation, the object of my invention is to provide an illuminating device having a source of light and a means for reflecting the light and directing the light for illuminating the pathway ahead and in addition thereto, a means of shielding the light so that it is not visible above a certain predetermined line.

A still further object is to provide a device of the kind mentioned in which rays of light directed in a direction where they would be valueless are returned to the reflector in the device where they are directed in the desired direction for illumination.

These and other objects will be more fully explained as this description progresses.

Referring to the drawing, Fig. 1 is a vertical sectional view through the device. Fig. 2 is an enlarged perspective detail of the shield arrangement. Fig. 3 is a horizontal sectional view through the lens. Fig. 4 is a vertical sectional view through a modified form of the reflector and shield. Fig. 5 is a vertical section through still another modification of the device. Fig. 6 is a vertical sectional view through a light bulb in which the invention is embodied. Fig. 7 is a vertical sectional view through the lens and a modified form of the shield. Fig. 8 is a vertical sectional view through a light bulb in which additional details of the invention are embodied. Fig. 9 is a vertical sectional view through a lens having varying size prisms and also showing the position of the shields in relation to the lens and the beam of light produced thereby.

In the drawing, similar numerals of reference refer to the same parts throughout the several figures.

Referring to Fig. 1 in which is shown the principle of the invention. At 10 is represented the source of light, which is within the confines of a reflector 11, the front of which is covered with a prismatic lens 12, in front of which is positioned a series of shields 13 and 14, which is composed of a series of opaque strips 13—13x, and 14—14x, said strips 13 and 13x being spaced apart in the same plane and the opaque strips 14 and 14x being spaced apart in the same plane, but the two planes containing the strips 13—13x and 14—14x are spaced apart and are positioned on opposite sides of a focus point 15, produced by the lens 12.

As illustrated in Fig. 1, the light is produced at the source 10 and is cast on the reflector 11, as illustrated by the lines 16 and the reflector 11 reflects the light in parallel horizontal beams as illustrated by the lines 17. The beams 17 pass through the lens 12 which contains the prisms 18 which causes the light to be broken up in a series of beams of light, each of which focuses at a point 15 which is positioned between the shields 13 and 14 as previously described. The beams of light projected from the lens 12 are in the form of a wedge shape as illustrated at a and a' in Fig. 2, and focus at a line 15—15, and continue from the line 15—15 in the same form as represented at b—b', the upper lines 19 of the beam of light traveling in a horizontal direction, and the lower lines 20 of the beam of light traveling in a downward direction.

It is obvious from the foregoing description that the general trend of the beam of light is in a downward direction and has passed through the open spaces 13a and 14a in the shields. Since the light was focused on the line 15—15 and the shields 13—13x and 14—14x are positioned to meet the lines defined to meet the light, it is obvious that no light has been stopped and the beam of light has been projected, the same as if the shields were not there. Consequently the pathway ahead has been properly illuminated and there has been no loss of light.

Now assuming that a person is approaching the light and the line of vision is as represented by the lines 21, it is obvious that the line of vision will pass through the slits 14a and will fall upon the shield 13x which is opaque and therefore stops the view and the person approaching the light cannot see the reflector nor the source of light, consequently there is no glare from the light experienced by the person approaching the light.

While the illustration in Fig. 2 deals with a single beam of light, it is obvious, as shown in Fig. 1 that there are numerous duplicate beams of light projected from the device which merge into a single beam of light 22—22x which bears all of the characteristics of that described for Fig. 2.

The description of the beam of light has been in reference to the vertical section of the beam of light that has been projected forward. Now it is desirable to spread the beam of light sideways. This is accomplished by a series of vertically positioned flutes or prisms 23 which are formed on the front side of the lens 12 as illustrated in Fig. 3.

In Fig. 5 is illustrated a reflector 11x which is provided with a series of curved portions, each of which will reflect a focused beam of light, the focus point being at 15x and is positioned between the shields 13 and 14 as previously described and the effect of the shields 13 and 14 is the same as described in Figs. 1 and 2. It will be understood that in this device there is no lens and the reflector functions to focus the beams of light so that the lens is not necessary.

In Fig. 4 is shown the same reflector 11x and the shield is composed of the elements 14 as previously described and the opaque portions of the shield 13 as described in Fig. 2 are curved as at 13y in Fig. 4, and the faces facing the light source 10x are reflectors and are so positioned as to reflect light from the light source back to the light source and onto the reflector 11x from where it is reflected through the openings in the shields to form the diverging beam of light the same as previously described.

In Fig. 7 is shown the lens 12 having the prisms 18 as previously described which receive the parallel beams of light 17 and project and focus them as previously described. The shields 14a and 13b are formed preferably of sheet metal strips set in V shaped positions, outlining the converging beams of light, and having a space 13c therebetween to permit the passage and projection of the beam of light. The dotted lines 21a represent the line of vision of a person approaching the light and it is obvious that the vision is stopped by the plates 14a so that the reflector or light source is concealed from view.

In Fig. 9 is shown a lens 12 having a series of varying size prisms 18a, 18b, and 18c which focuses the beam of light similar to that previously described, and at 13 and 14 are shown the shields as previously described and provided with slits 13a and 14a through which the beam of light is projected. The lines 21b represent the lines of vision of a person approaching the light and again it is obvious that the lines of vision may pass through the slits 14a and fall on the opaque portions 13x where the vision is stopped and the reflector and light source is again concealed from view.

Now referring to Fig. 6, this figure shows a vertical section of a light bulb, the walls of which are opaque with the exception of the portion 13d which will transmit light. The bulb is silvered to act as a reflector and the light source is at the point 10a and the light developed at the point 10a is cast on the walls 11a of the light bulb which reflect the light in a converging beam that focuses in the point 13d and continues in a diverging beam 22y, the top edge of which travels in a horizontal plane while the lower edge of which travels in a downwardly direction and the light source and the reflector of the bulb are concealed from view, the same as previously described.

In Fig. 8 is shown a vertical section of a light bulb, the walls of which are opaque except at the portion 13e which is transparent and will permit the passage and projection of light. The walls 11b of the bulb are silvered for the purpose of reflecting light. The bulb is made with the walls having a series of curved faces 11c which are also silvered as a reflector, and are adapted to reflect light originating at the light source 10b and back to the light source and from there on to the walls 11b from where the light is reflected in a converging beam that focuses at the point 13e and continues as a diverging beam 22z.

This arrangement utilizes all of the light produced at the light source 10b and projects the light in the beam 22z as is obvious. It is also obvious that this device conceals the reflector and light source from view, the same as has been previously described.

Such modifications of my invention may be employed as lie within the scope of the appended claims, without departing from the spirit and invention thereof. Now having fully described my invention, what I claim as new and desire to secure by Letters Patent is;

1. In an illuminating device, means for producing a beam of parallel rays of light, a lens having prisms each converging a portion of the light to a focus with the foci lying in a vertical plane, and shield means comprising a pair of vertical, axially spaced apart, plates disposed one forwardly of the foci and the other rearwardly thereof, each plate having a series of horizontal slots with the upper edge of each slot in one plate in a horizontal plane with the lower edge of its companion slot in the other plate; said slots being so arranged as to permit all the parallel rays refracted by the prisms to pass unobstructed thru the slots.

2. In an illuminating device, means for producing a beam of parallel rays of light, a lens having a series of prisms of varying size each converging a portion of the light to a focus with the foci all lying in a vertical plane, and shield means comprising a pair of axially spaced apart, vertical, plates disposed one forwardly of the foci and the other rearwardly thereof, each plate having a series of horizontal slots of varying width co-acting with companion size prisms, said slots being arranged with the lower edge of each slot in the rear plate in the same horizontal plane with the upper edge of its companion slot in the front plate and permitting all the parallel rays refracted by the prisms to pass unobstructed thru the slots.

3. In a headlight, a casing, a source of light, a parabolic reflector in the casing for reflecting the light in parallel rays of light, a lens supported in the casing at the front of the reflector having prisms each converging a portion of the light to a focus with the foci lying in a single vertical plane, and shield means supported by the casing comprising axially spaced apart shields disposed one forwardly of the foci and the other rearwardly thereof, each shield having a series of horizontal opaque portions providing a series of horizontal slots with the upper edge of each opaque portion in the rear shield member in the same horizontal plane with the lower edge of its companion opaque portion in the front shield member; said slots being so arranged as to permit all the parallel rays refracted by the prisms to pass unobstructed thru the slots.

HARRY D. VAN LEUNEN.